(12) United States Patent
Shuster et al.

(10) Patent No.: US 7,546,530 B1
(45) Date of Patent: Jun. 9, 2009

(54) METHOD AND APPARATUS FOR MAPPING A SITE ON A WIDE AREA NETWORK

(75) Inventors: Brian Mark Shuster, Stateline, NV (US); Gary Stephen Shuster, Oakland, CA (US)

(73) Assignee: Hoshiko LLC, Henderson, NV (US)

(*) Notice: Subject to any disclaimer, the term of this patent is extended or adjusted under 35 U.S.C. 154(b) by 0 days.

(21) Appl. No.: 09/549,505

(22) Filed: Apr. 14, 2000

Related U.S. Application Data (60) Provisional application No. 60/129,471, filed on Apr. 15, 1999.

(51) Int. Cl.
*G06F 17/27* (2006.01)
*G06F 17/21* (2006.01)

(52) U.S. Cl. ............ 715/272; 715/234; 715/243; 715/273; 715/277; 715/738; 707/10; 707/103 R; 709/218

(58) Field of Classification Search ............ 715/514, 715/513, 907, 501.1, 234, 243, 272, 273, 715/277, 738; 707/10, 105 R; 709/218
See application file for complete search history.

(56) References Cited

U.S. PATENT DOCUMENTS

| | | | | |
|---|---|---|---|---|
| 5,765,176 A | * | 6/1998 | Bloomberg | 715/514 |
| 6,035,330 A | * | 3/2000 | Astiz et al. | 709/218 |
| 6,069,630 A | * | 5/2000 | Lisle et al. | 345/804 |
| 6,070,176 A | * | 5/2000 | Downs et al. | 715/513 |
| 6,169,997 B1 | * | 1/2001 | Papierniak et al. | 715/501.1 |
| 6,237,006 B1 | * | 5/2001 | Weinberg et al. | 707/103 R |
| 6,330,572 B1 | * | 12/2001 | Sitka | 707/205 |

* cited by examiner

*Primary Examiner*—Joshua D Campbell
(74) *Attorney, Agent, or Firm*—Connolly Bove Lodge & Hutz LLP; Jonathan A. Jaech (57) ABSTRACT

A method and system for organizing and displaying information about Internet Web pages creates Web maps. The Web maps display a summary of the information that a Web page provides access to, in a format that facilitates a rapid assessment of what may be accessed through a Web site's home page, or through any Web page on the Web site. Preferably, Web maps are displayed on a Web page, or within a frame of a Web page, by an Internet browser application. A set of Web maps may be automatically generated by a search engine or directory in response to a user's search request. Alternatively, a user may request that a Web map be produced for a particular Web page of interest. The Web maps are preferably generated by a Web server, or by an application running in the background of a user's computer, so that the user may perform other tasks on the user's computer while the Web maps are being generated.

19 Claims, 5 Drawing Sheets

METHOD AND APPARATUS FOR MAPPING A SITE ON A WIDE AREA NETWORK

CROSS-REFERENCE TO RELATED APPLICATION

This application claims the benefit of U.S. Provisional Application No. 60/129,471, filed Apr. 15, 1999, which application is specifically incorporated herein, in its entirety, by reference.

BACKGROUND OF THE INVENTION

1. Field of the Invention

The present invention relates to locating information on a wide area network such as the Internet; and more particularly, to a method and system for organizing and displaying information about Internet Web sites on Web site maps.

2. Description of Related Art

The amount and variety of information accessible on the Internet, and in particular, through the World Wide Web, is now extremely vast and continues to grow very rapidly. At the same time, as the Internet grows in popularity, locating useful and accurate information on the Internet is becoming both more important and more challenging.

Various information services, such as search engines and Internet directories, have been developed to help Internet users locate information. Search engines and Internet directories are typically accessible through Web sites. Some Web sites provide access to multiple search engines, or to combinations of search engines and directories. Although they operate differently, search engines and directories all deliver their information in a similar format: as a list of URL's for selected websites (commonly called "hits"), organized by category and/or by search query. Typically, each hit is presented as a hyperlink on a Hyper Text Mark-up Language (HTML) results page produced by the search engine or directory. Such results pages often list other information about each hit, such as the Web site Meta Tags, and prioritize the hits using a variety of prioritization algorithms.

It is up to the person seeking information from the search engine or directory to determine which of the URL's on a results page points to a useful Web site. Commonly, the usefulness of a particular Web site can only be determined by connecting to the Web site through the hyperlink on the results page, reviewing the first linked page; reviewing a second page through a hyperlink found on the first linked page; reviewing a third page through a hyperlink found on the second linked page (or perhaps on the first linked page); and continuing the process of reviewing a Web site's hyperlinks until the desired information has been found or the search is abandoned. There are often delays associated with viewing Web pages in this manner because of the time required to transmit, receive, and display selected Web pages, and because of network errors, such as expired hyperlinks and unresponsive Web servers. Furthermore, if the desired information has not been found (which all too often is the case) through a first hyperlink, the user must then return to the results page to explore the other hyperlinks presented there. If the desired information is not found using the first results page, the user must formulate a second search, or run a search using a different search engine or different directory. Frequently, the process of running and exploring searches is very time consuming and requires much viewing of irrelevant or non-useful information.

Thus there is a need for a more efficient way to assess the information accessible through Web pages, and particularly when hyperlinks to a set of Web pages are presented as the results of a search run on an Internet search engine or directory.

SUMMARY OF THE INVENTION

The present invention provides a method and system for organizing and displaying information about Internet Web pages on Web maps. Web maps display a summary of the information that a Web page provides access to, in a format that facilitates a rapid assessment of what may be accessed through a Web site's home page, or through any Web page on the Web site to which the Web site links. Preferably, Web maps are displayed on a Web page, or within a frame of a Web page, by an Internet browser application. A set of Web maps may be automatically generated by a search engine or directory in response to a user's search request. Alternatively, a user may request that a Web map be produced for a particular Web page of interest. The Web maps are preferably generated by a Web server, or by an application running in the background of a user's computer, so that the user may perform other tasks on the user's computer while the Web maps are being generated.

Using a Web server to generate maps typically has the advantage of being faster than generating maps on a users computer, because Web servers typically have faster network connections than client computers. Preferably, a Web map is much smaller in size than the Web page or pages that it maps, and is formatted to facilitate rapid transmission to a user's computer. A Web map is also preferably organized in a clear, simplified manner to facilitate rapid viewing and comprehension. After being generated, a Web map may be reviewed by the user to assess the information accessible through the mapped Web page much more quickly than visiting the Web page and exploring its hyperlinks. Preferably, the Web maps include hyperlinks from the mapped Web page so that someone reviewing the map may link to the mapped Web page and related Web pages for which hyperlinks have been identified.

A more complete understanding of the present invention will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for a method and system for searching a wide area network, that overcomes the limitations of prior art search engines and directories. In the detailed description that follows, like element numerals are used to describe like elements illustrated in one or more figures. Various terms and acronyms are used throughout the detailed description, including the following:

Application. Within the context of computer hardware and software, an application is a set of one or more computer programs that performs a function when executed within a computer hardware device. If the set is comprised of plural programs, the programs are coordinated to perform a function together; such programs may individually perform other functions. Similarly, a program may be comprised of plural modules that perform certain functions individually and other functions when combined in various ways.

Client-Server. A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user; the program which responds to browser requests by serving Web pages is commonly referred to as a "Web server."

Distributable application. An application coded in a language, such as the JAVA language developed by Sun Microsystems, Inc., such that the application may be distributed over a wide area network, such as the Internet, and be successfully executed on a variety of computer hardware models running various operating systems.

Hyperlink. A navigational link from one document to another, or from one portion (or component) of a document to another. Typically, a hyperlink is displayed as a highlighted word or phrase that can be selected by clicking on it using a mouse or other pointing device to jump to the associated document or documented portion.

Hypertext System. A computer-based informational system in which documents other types of computer files are linked together via hyperlinks forming a user-navigable "web."

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both (i) a distributed collection of interlinked, user-viewable Web pages and other linked data and distributable applications that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Page. A hypertext file or document that is encoded using a language such as HTML for viewing on a client computer using a browser application. A Web page may include visible components, such as text, images, hyperlinks, and a background, and/or invisible components, such as meta tags and formatting instructions. In comparison to the term "Web page," the more general term "page" encompasses many other types of computer files that are not necessarily encoded for viewing using a browser, e.g., text files, bit-maps, audio files, and so forth.

Web Map. A Web map is a Web page containing a graphical representation of information contained on another Web page, referred to as the "target page," and on Web pages and other pages that the target page contains a hyperlink to. A Web map does not contain a mere copy of the target page, but rather selected information from the target page and its linked pages, presented in a summary format, and organized according to a set of mapping rules.

Web Site. A computer system that serves informational content over a network using the standard protocols of the World Wide Web. Typically, a Web site corresponds to a particular Internet domain name, such as "electronsearch.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

HTML (HyperText Markup Language). A standard coding convention and set of codes for attaching presentation and linking attributes to informational content within documents. (HTML 2.0 is currently the primary standard used for generating Web documents, although it should be appreciated that other coding conventions could be used within the scope of the present invention.) During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally in specifying how the Web browser is to display the document, HTML tags can be used to create links to other Web documents (commonly referred to as "hyperlinks").

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

URL (Uniform Resource Locator). A unique address which fully specifies the location of a file or other resource on the Internet. The general format of a URL is protocol://machine address:port/path/filename. The port specification is optional, and if no port is specified, the browser defaults to the standard port for whatever service is specified as the protocol.

The foregoing definitions are not intended to limit the scope of the present invention, but rather are intended to clarify terms that are well understood by persons having ordinary skill in the art, and to introduce new terms helpful for describing the present invention. It should be appreciated that the defined terms may also have other meanings to such persons having ordinary skill in the art. These and other terms are used in the detailed description below.

Figure 1:
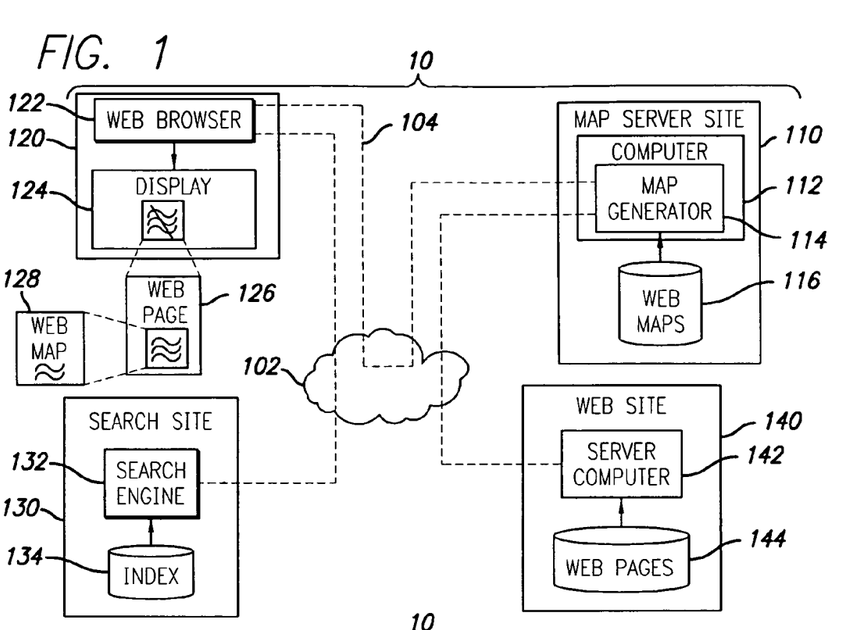
FIG. 1 is a high-level architectural drawing illustrating the primary components of a system that operates in accordance with one embodiment of the present invention.

Preferred embodiments of the present invention operate in accordance with a plurality of networked computers, such as, for example, a user computer and a server computer which are coupled together on a communications network, such as, for example, the Internet or a wide area network. FIG. 1 depicts a network system 100 that operates in accordance with the preferred embodiment of the invention. In the preferred embodiment, the network system 100 includes a map server site 110 comprising map server computer 112, or a provider computer, and a client, or user computer 120. The map server computer 112 provides a map generator application 114 and, preferably, access to a database 116 of Web maps 128. User computer 120 has a Web browser 122 for displaying Web page 126 on a display 124. Web page 126 preferably includes a Web map 128 at the selection of a user. In the preferred embodiment, map server computer 112 and the user computer 120 are in electronic communication with each other via a communication link 104 connected to the Internet 102. Network system 100 may further comprise a Web site 140 having a server computer 142 with access to a database 144 of Web pages containing information of interest to users. In addition, network system 100 may further comprise at least one search site 130 having a search engine 132 and a Web index 134 for locating Web pages containing information of interest to users. Web site 140 and search site 130 are in electronic communication with each other and with the map server 112 and user computer 120 by communication links 104 connected to Internet 102. In another preferred embodiment, the network system 100 includes a plurality of either the map server site 110, the user computer 120, the search site 130, the Web site 140, or any combination thereof.

Figure 2:
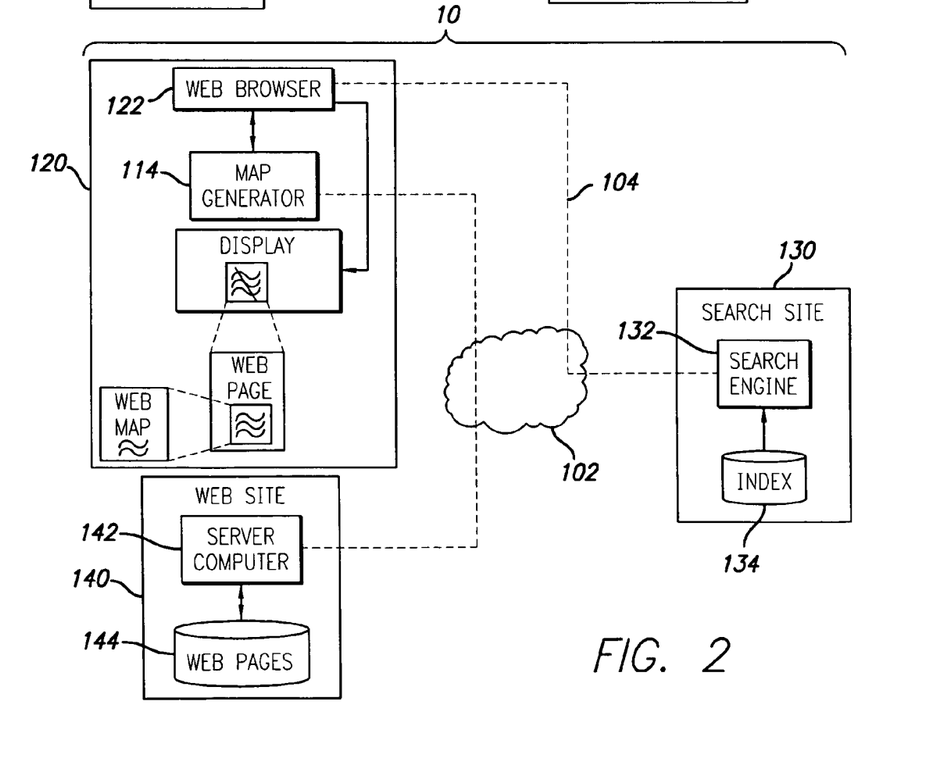
FIG. 2 is a high-level architectural drawing illustrating the primary components of a system that operates in accordance with a second embodiment of the present invention.

In an alternative embodiment exemplified by FIG. 2, the network system 100 does not include a separate map server site. In this embodiment the network system 100 includes a client, or user computer 120, having a map generator application 114 and access to a database 116 of Web maps 128, and a Web site 140 having a server computer 142 and access to a database 144 of Web pages 126. User computer 120 further comprises a Web browser 122 for displaying Web page 126 on a display 124; Web page 126 preferably includes a Web map 128 at the selection of a user. As in the preferred embodiment, Web site server computer 142 and the user computer 120 are in electronic communication with each other via communication links 104 connected to the Internet 102. In some embodiments, network system 100 further comprises a search site 130 having a search engine 132 and a Web index 134 for locating Web pages containing information of interest to users. Search site 130 is in electronic communication with Web site server 142 and user computer 120 by communication links 104 connected to Internet 102. Network system 100 need only include those components necessary for a single user to view a Web map 128 of a Web page 126, although the system 100 may include additional components for improving the performance of the system and the scope of information available to users.

Figure 3:
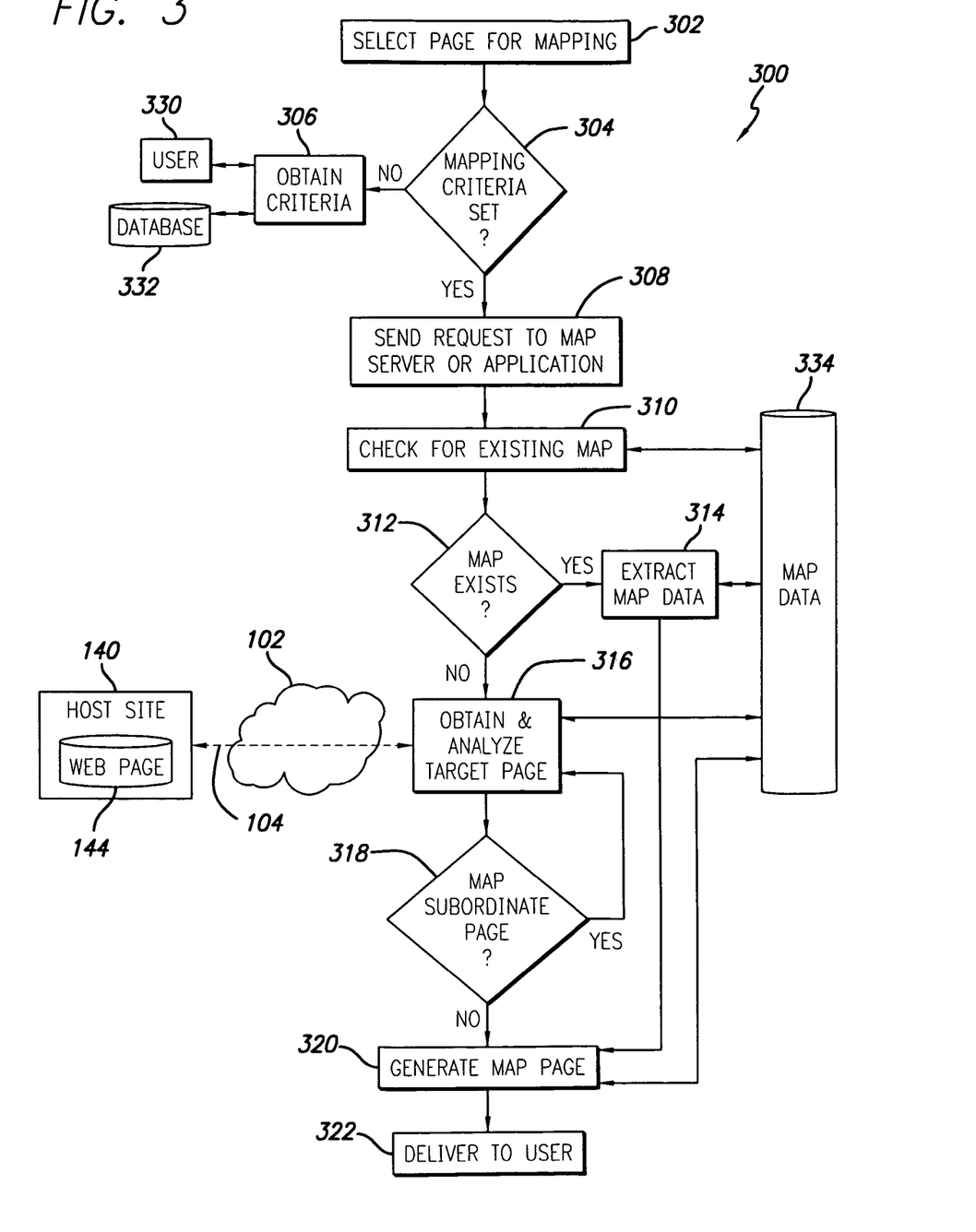
FIG. 3 is a flow diagram illustrating a method for creating a Web map and delivering it to a user.

Referring now to FIG. 3, a flow chart illustrates exemplary operation of a method for mapping a Web page using a map generator application and a connection to a wide area network. At step 302, a Web page, referred to as the "target page," is selected for mapping. Users may select a target page by a variety of methods. For example, a hyperlink to another Web page may appear on a specially designed Web page being viewed by a user with a browser running on a user computer. A user may select the target page for mapping by moving a pointing device, such as a computer mouse, so that the computer cursor is on top of the hyperlink, a move referred to as "mousing over" the hyperlink. The Web page being viewed is designed so that when a hyperlink is moused over, a command menu pops up. One of the options offered by the command menu is to generate a Web map of the page that the hyperlink refers to. The user selects the mapping command, causing the hyperlinked page to be identified as a target page. Various other methods for providing input to a computer system are known, and may be used to select one target page, or a group of target pages. Such methods include using a keyboard to enter URL's and commands, selecting URL's and commands using a pointing device in conjunction with a graphical user interface ("GUI"), or issuing verbal commands for recognition by a speech recognition software. Essentially, any method for specifying a URL or other page address, or a set thereof, may be employed, along with any method of specifying a command, in any combination.

Target pages may also be selected automatically using preset criteria. For example, criteria may be set so that the first ten results retuned from a query executed by an Internet search engine are selected for mapping. Such criteria may be specified in advance by the user, or may be specified by the system. Thus, if the user is creating a list of Web pages to review from a compilation of search results, as discussed in the related U.S. patent application entitled "METHOD AND SYSTEM FOR SEARCHING A WIDE AREA NETWORK," filed on Apr. 14, 2000, Ser. No. 09/548,803, and fully incorporated herein by reference, each of the Web pages is preferably mapped at the time the list is compiled. This saves time for the user in reviewing the search results as the initial review can be conducted from a list of the contents of each page, and in some instances, descriptions of the links, prior to the user ever utilizing time to access any of the Web pages. Whatever method of selection is used, the selection is complete when a unique identifier for the target page, typically a URL, is specified and ready to be sent to a mapping application as part of a mapping request.

At step 304, the system checks to see whether mapping criteria for the target page are set. If the criteria are not set, the criteria are obtained in a step 306 from the user 330 or a database 332. Various criteria may be used to determine the format, organization and content of a Web map. Mapping criteria preferably include the number of levels to map, the amount of information to gather from each target page, the maximum size of each web map, the preferred format and organization of the web map, and so forth. Mapping criteria may be set by the user for each target page individually, set for a group target pages, or specified in a database by the system or user for repeated use for a preset number of target pages. Alternatively, mapping criteria may be set by default at the map server level and are the same for all requests received by the server. User-specified and system default criteria may be combined in various ways.

At step 308, the request for mapping including map criteria is sent to the map server or map generating application for processing. At step 310, the system checks to see whether there is existing map data or an existing map page for the requested target page using the criteria as specified. The system checks for an existing map page or map data by consulting a database 334, containing map data and/or map pages generated during prior map requests. At step 312, if it is determined that there is a map in existence, then at step 314, the map data for the target page is extracted from the database of map data 334 and sent to a map generating step 320. In the alternative, if a map page is stored in map database 334, when another request for the map page is received, the map page is extracted from database 334 and sent directly to the user at step 332, bypassing page generation step 320.

Referring back to step 312, if there is no previous map in existence, then, at step 316 data for generating a new map is obtained and analyzed from the target page. Using the URL address of the specified target page, the map generating server sends a request to the host site 140 for the web page located in a database of Web pages 144 through communication links 104 connected to internet 102. Host site 140 responds by sending the target page to the map generating server. At step 318, the map request and map criteria are consulted to see whether there are any subordinate pages that require mapping by analyzing links on the target page and checking to see how many map levels have been requested. Preferably, at least two levels are always requested so that the map contains information from the target page and from the subordinate pages that the target page links directly to. If information from a subordinate page has been requested, then step 316 is repeated to obtain and analyze the data from the subordinate page. Steps 316 and 318 are repeated until all levels of subordinate pages for which mapping information has been requested, i.e., all map levels, have been obtained and analyzed. Then, at step 320, all the mapping data which has been obtained by analyzing the web pages and linked subordinate pages is sent to a map generating application for generating the map pages. In the same step 320, after map data has been obtained, it is stored in database 334 for future use.

Alternatively, map pages generated in at step 320 may be stored in database 334 in addition to or instead of map data. Storing map pages provides the advantage of obviating the need to generate a map page to service a second request for the map page. However, map pages require more storage space than bare map data, so database costs may be higher and retrieval time may be longer if pages are stored and requested as opposed to data. In addition, it is advantageous to regenerate the map page when a second page request is received, so that current information, such as paid advertising, can be incorporated into the map page for viewing by the user. Thus, so long as the time and expense required to perform the page generation step 320 are not too great, it is preferable to store only map data and generate pages upon each map request. Of course, the methods may be combined to realize advantages of both. For example, map pages may be stored and retrieved for a period of time, and after a map page reaches a predetermined age, the map page may be deleted from database 334. The underlying map data may be retained in database 334 for a second, longer period.

Various rules may be applied to generate various maps having different appearances. At step 320, the mapping data gathered at steps 316 and 318 and residing in database 314 is used in conjunction with a preset set of mapping rules to generate a graphical Web map. Exemplary operation of mapping rules for generating a Web map are described in more detail later in the specification. It should be appreciated, however, that various mapping rules and various appearances of Web maps may be produced within the scope of the present invention. After Web maps are generated, preferably in a graphical format for use in a browser, such as HTML format, they are delivered to a user at step 322 for viewing.

Figure 4:
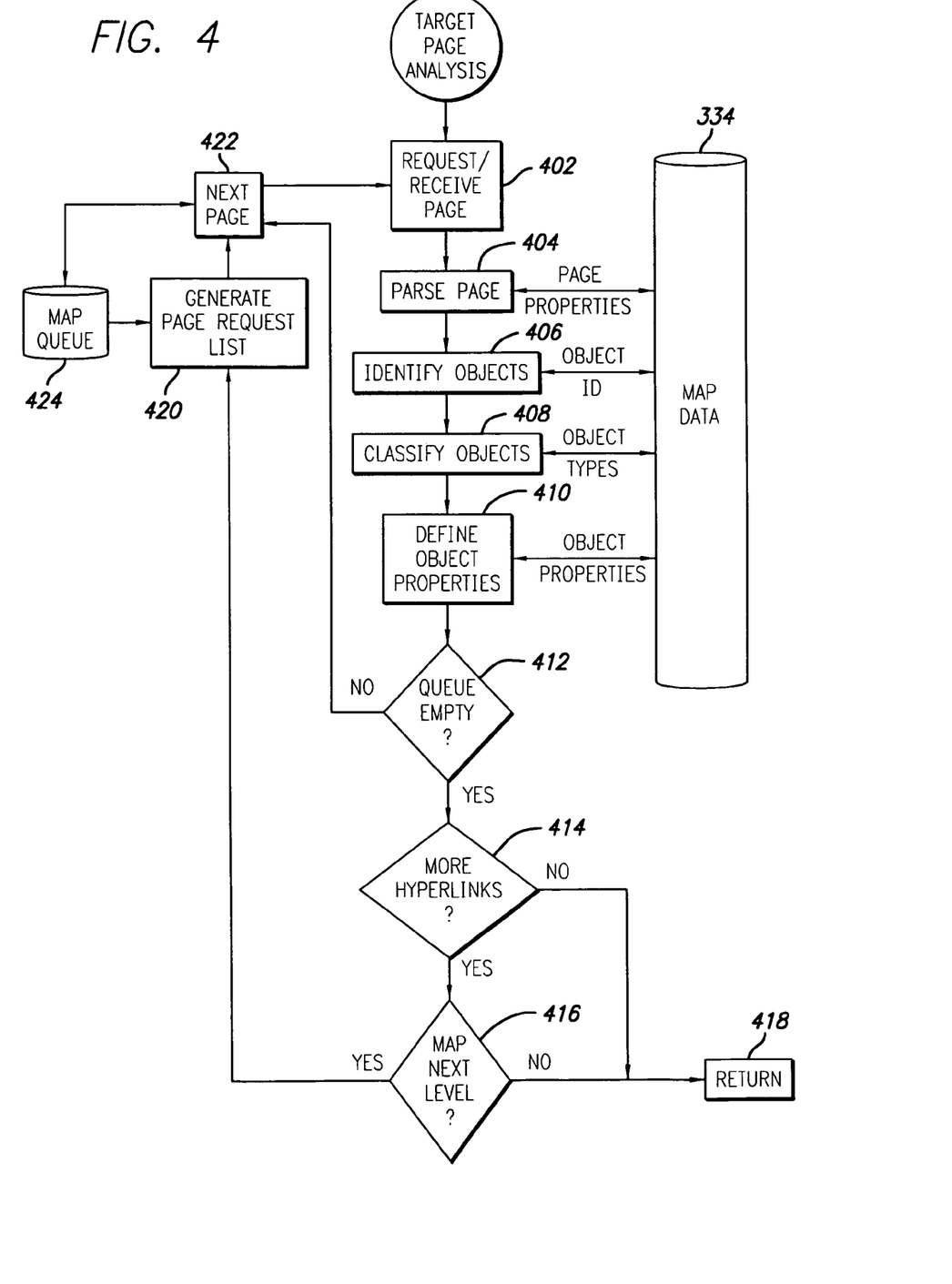
FIG. 4 is a flow diagram illustrating further details of a method according to FIG. 3.

Referring now to FIG. 4, a flow chart illustrates exemplary operation of a method for mapping a Web page and in particular a method for analyzing a set of target pages. At step 402, a first target page in a set of target pages is requested from the Web host for the page. The target page is then received by the map generating server or map generating application and parsed at step 404. "Parsing" is a process for reading a page using a set of automated rules and recognition algorithms embedded in software. Parsing software is programmed to recognize, identify and count commonly encountered objects found on Web pages. At step 404, the target page is parsed and page properties are identified. Page properties include, for example, the page title, the page size, the location of the page, the date created or revised, the author or copyrights associated with the page, the key words found in the page meta tags, and so forth. Page properties may also include measured and imputed properties that are not inherently in the page but are rather a function of its location, use, and other relational qualities. For example, the number of objects found on the page, and the page response time, i.e., the amount of time it requires for the page to load from the web host, are measured page properties. The mapping date and time and the identity of the map requestor are examples of imputed page properties. After reading, identifying and/or measuring the page properties, at step 404 the page properties are stored in database 334 containing map data.

At step 406, the parsing process continues as the method is used to identify different objects that exist on the target page. An object is "on" a target page when it is contained within a file, or set of files, defining all the page content. Typically, the content of a Web page is completely defined by a single HTML file. At step 406, as objects are identified by the parsing software, an object identification code ("object ID") is assigned or collected from the target page data for each object identified. For example, an object ID for a hyperlink may comprise the hyperlink's URL plus a page identifier, or the title of the page that the URL links to. An object ID for a block of text may comprise the first ten words in the block, plus a page identifier. The object identifications are stored in the database of map data 334. Proceeding to step 408, which may be performed concurrently with step 406, the objects identified in step 406 are classified according to a database of object types residing in map data database 334. Various different types of objects are typically found on web pages. For example, commonly encountered objects include text hyperlinks, graphics, hyperlinks to other pages, hyperlinks to graphic files, hidden text, background and formatting and so forth. It is preferable to classify the different objects encountered on a web page in order to better and more consistently describe and summarize the object properties.

In step 410, object properties are defined. In a general sense, an object property is anything that is helpful for summarizing the information content of an object. For example, properties of a "block of text" object may include the size of the block of text, phrases extracted from various portions of the block of text, key words extracted from the block of text, and placement of the block of text within the Web page. For further example, properties of a graphical object include its title, its file size, and a thumbnail portion of the graphical object. It should be appreciated that object properties are not limited by the foregoing examples and may include any summary information concerning an object which is of interest to a user. According to the parsing rules of the parsing software described above, in step 410 the object properties are identified, defined and stored in database 334. After the object properties are stored in step 412, a queue of target pages in database 424 is checked. If there is another target page in the queue, then at step 422 the next page is selected. The foregoing process, beginning with step 402, is then repeated for the next page in the queue.

If there are no more target pages in the queue, then at step 414, the objects identified in the previous set of target pages are reviewed to see if any hyperlinks are included among the objects identified on the first set of target pages. If there are no hyperlinks identified on the previous target pages, the analysis process is complete for the set of target pages and the method returns at step 418. If hyperlinks are identified then at step 416, the mapping criteria described above are applied to determine whether the next level of hyperlinks is to be mapped. If according to the system criteria the hyperlinks are not to be mapped, then the analysis process is complete for the previous set of target pages and the method returns at step 418. If the next level of hyperlinks is to be mapped, then at step 420, a page request list is generated comprising pages referred to by the hyperlinks on the previous set of target pages. The page request list is stored in map queue database 424. Then, at step 422, the next page in the map queue is selected. Proceeding to step 402, the next target page is requested as described previously, and the analysis process repeats until all pages, and all levels of target pages, have been analyzed according to specified user and system criteria.

Figure 5:
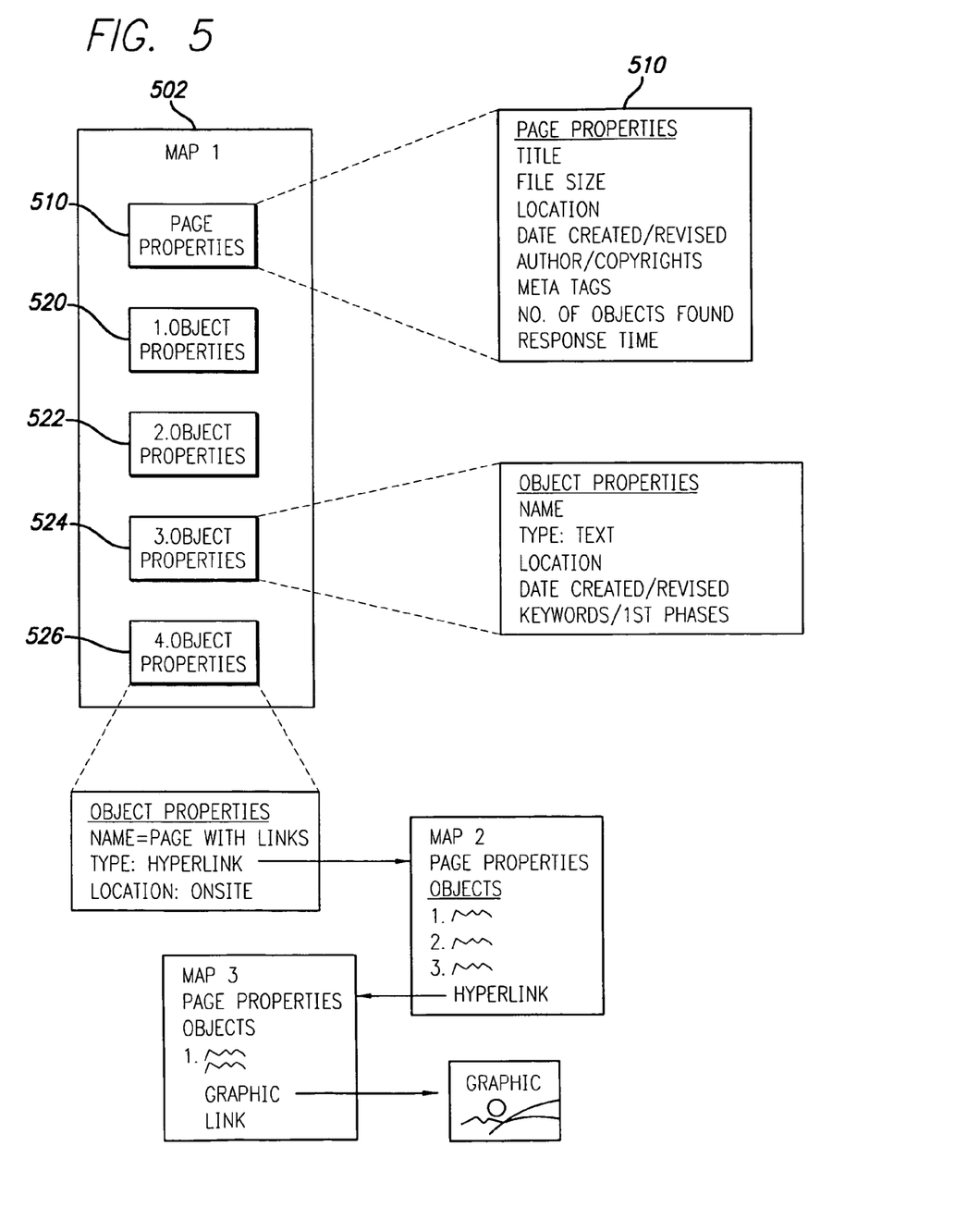
FIG. 5 is a diagram illustrating a layout and organization of a Web map according to the invention, and further illustrating a relationship between multiple Web maps.

After map data has been analyzed and stored in database 334, map pages are generated at step 320 as previously discussed with respect to FIG. 3. In FIG. 5, a layout and organization of a Web map according to one embodiment of the invention, is illustrated. FIG. 5 further illustrates an example of a relationship between multiple Web maps. It should be appreciated that FIG. 5 does not represent an actual depiction of a Web map, but is a schematic diagram illustrating the organization of a Web map. Web map 502 contains page property set 510 and four object property sets 520, 522, 524, and 526, because, in this example, the underlying target page contains four objects. Page properties 510, including, as discussed above, title, file size, location of the page, so forth, are presented in a compact format that allows a user to quickly understand and assess the page properties. It should be appreciated that the page properties are preferably not merely described with text in an enumerated list, but are rather displayed using a combination of text and graphics so that the information is quickly and easily reviewed. Similarly, object properties for example object properties 524 are not merely listed but are also displayed using a combination of text and graphics. For example, object properties 524 are provided for a block of text. The object type, being text, need not be listed because the manner of display—e.g., providing a sample of text—makes it clear that the object type is text.

For further example, on Web map 502, the fourth object, having object properties 526, is a hyperlink to another Web page. The object type, in this example, "hyperlink," is preferably presented using graphical features, such as a special font or font color; for example, presenting all hyperlinks in bolded, blue, underlined fonts. Furthermore, when presenting a compact object such as a hyperlink, the essential properties of the object are retained. For example, hyperlink objects on a Web map are responsive to user actions, including keystrokes and pointer movement, in much the same way as the underlying hyperlink on the target page. In addition, new properties can be assigned to mapped objects by applying mapping rules. In this manner, in the preferred embodiment of the invention, it is possible for a user to select the hyperlink mapped on Web page 502, and generate a Web map for the underlying target page by request. In the foregoing example, Web map 530 of a second target page is generated when the hyperlink listed in object property set 526 is selected and a mapping command is issued by the user. The second target page also contains a hyperlink to another Web page, so Web map 530 contains an object property set 532 for the hyperlink.

Similarly, the hyperlink mapped on Web map 530 may also be selected by a user, and a third Web map 540 of the linked Web page may be requested. In the foregoing example, the target page mapped by Web map 540 contains a hyperlink to an image file, shown as graphic link 542. A user may select graphic link 542 for mapping, generating Web map 550, containing a "thumbnail" (reduced size) image 552 of the image on the target page, and related object properties 554, for example, file size, title, and estimated transmission time. Thus, the Web maps as exemplified in FIG. 5 are user navigable and enable users to explore any mapped object by requesting additional Web maps of new target pages linked to the page where an object is found.

Figure 6:
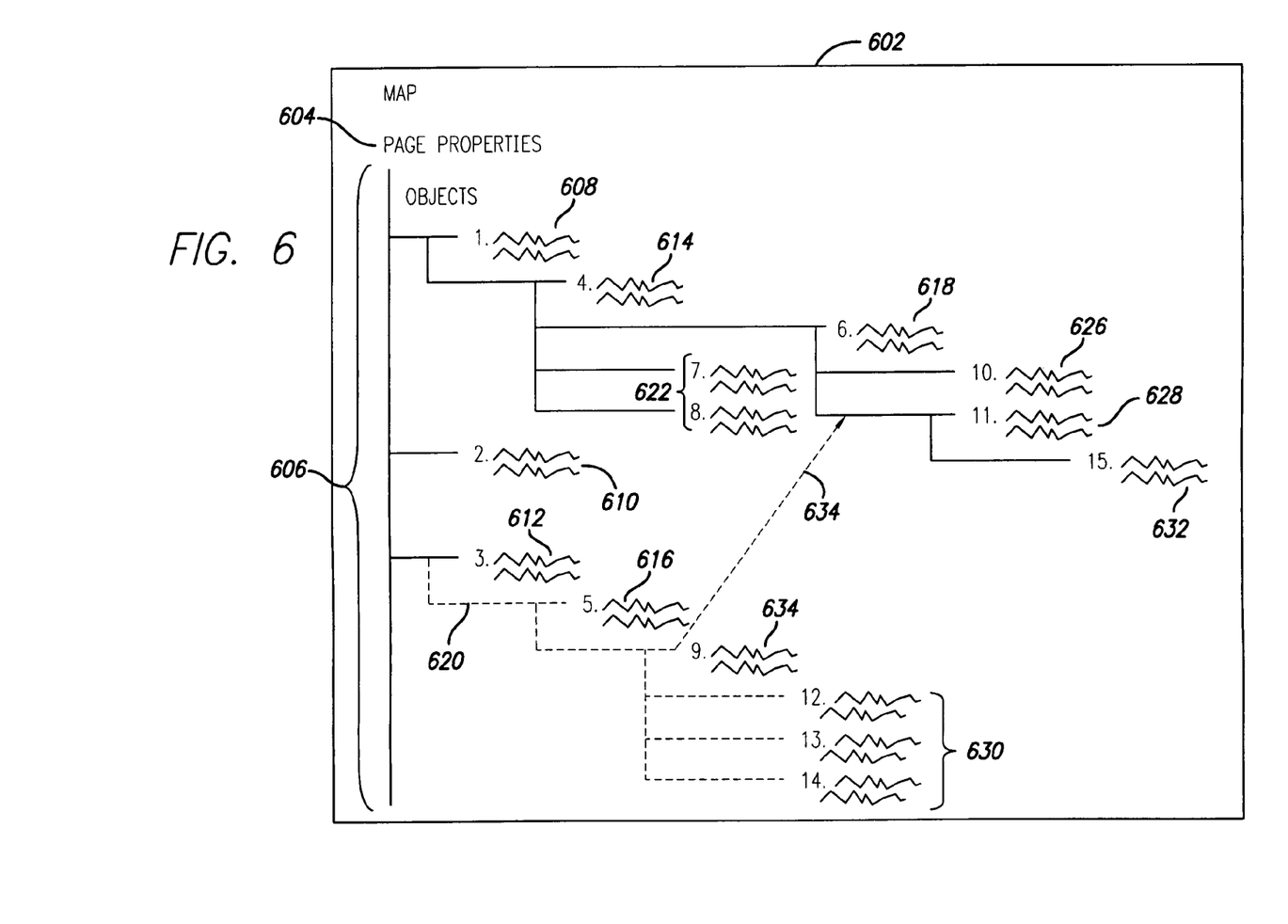
FIG. 6 is a diagram illustrating an alternative layout and organization of a Web map according to the invention.

Referring now to FIG. 6, a Web map organized according to another embodiment of the invention is exemplified. Web map 602 makes use of a hierarchical tree system to demonstrate relationships between related Web pages. As in Web map 502, Web map 602 also lists page properties in an object property set 604. Web map 602 further contains a tree 606, displaying other object property sets 608 through 632. These sets displayed to show both the level at which they reside and other relationships between underlying target pages.

On the first mapped target page, referred to as the first level of Web map 602, there are three objects mapped as object sets 608, 610, and 612. The first object on the target page, object 608, displayed with a numeral 1 on Web map 602, comprises a hyperlink to a second page represented as object 614, displayed with a numeral 4 on map 602. Object 614, is at the same level as object 616, displayed with a numeral 5. However, as indicated by dashed line 620, object 616 pertains to a target page which is external to the Website on which the original target page resides. Thus, the example demonstrates how graphical elements can be used to show different properties of underlying target pages.

Depending on how the mapping criteria are set, further levels can be mapped as shown on map 602. For example, objects 618, 622 and 624 reside on a third level of Web map 602. In this example, the criteria are set to map five levels deep. Therefore, the Web map further includes objects 626 and 628, both subordinate to object 618, and object 632, displayed with a numeral 15, at a fifth level and subordinate to object 628. Objects 626, 628 and 630, by comparison, all reside on a fourth level, although objects 630 are external to the host Web site and therefore are presented with dashed line 620, and objects 626 and 628 are shown as being on the same host Web site as the target page. Furthermore, arrow 634 demonstrates a link between object 624, displayed with a numeral 9, and object 628, displayed with a numeral 11. Arrow 634 provides a further example of a graphical Web map element being used to convey information about the relationship of target pages. In this example, object 624 resides on a target page containing a link, represented as arrow 634, to a second Web page which also appears on Web map 602, namely, object 628.

Similarly to Web map 502, Web map 602 preferably contains objects which comprise active hyperlinks. By selecting these hyperlinks, further details about the target pages may be presented. However, because Web map 603 contains relationship information which does not appear on Web map 502, it is preferable to provide additional details for objects listed on Web map 502 differently, so as to avoid unnecessary duplication of data. For example, secondary Web maps produced for objects on Web map 602 need not include active hyperlinks, because these are already in effect provided by the relationship tree 606. Thus, FIG. 6 exemplifies the application of a different set of mapping rules to produce a Web map based on map data which is different in appearance and function than the Web map produced and exemplified in FIG. 5. It should be appreciated that the almost unlimited variety and combination of objects and relationships which appear on and among Web pages make it possible to produce an almost unlimited variety of Web maps using many different principles of organization and mapping rules.

The organization, format, and content of Web maps, such as Web maps 502, and 602, are determined by operating upon underlying map data using a set of mapping rules, also referred to as mapping algorithms. Mapping rules are preferably encoded in software, using programming techniques which are known in the art. Such mapping rules or algorithms receive map object data and mapping criteria as inputs and operate upon them to produce a set of different objects which together comprise a Web map. Although the present invention provides for a very great variety in the format and organization of Web maps, it should be appreciated that Web maps have certain essential and distinguishing characteristics as compared to Web pages. For example, Web maps are always derived from other Web pages and have as their object the presentation and summary of information contained on a target page. Furthermore, according to the preferred embodiments of the invention, Web maps present and summarize information on at least one level of subordinate pages linked to a target page, on the same page as the map of the target page. Within this essential framework, a great many formats and methods of organization are possible.

Having thus described a preferred embodiment of a method and system for making Web maps for Web pages, it should be apparent to those skilled in the art that certain advantages of the within system have been achieved. It should also be appreciated that various modifications, adaptations, and alternative embodiments thereof may be made within the scope and spirit of the present invention. For example, a method and system for making Web maps for Web pages written in HTML 2.0 has been illustrated, but it should be apparent that the inventive concepts described above would be equally applicable to other HTML versions and other wide area network protocols. The invention is further defined by the following claims.

What is claimed is:

1. A method for providing information from hyperlinked pages over a computer network, comprising:
    mapping a plurality of target pages, each of the target pages having a network address and comprising at least one hyperlink to a related page;
    identifying a set of linked related pages for each of the plurality of target pages;
    parsing the set of target pages to generate page properties comprising a page address, page title, page file size, and metatags, for each page in the set of target pages;
    parsing the set of target pages to identify objects that exist on the target pages including text objects, graphical objects and hyperlink objects;
    defining an identifier for each object and defining object properties for the objects that exist on the target pages, wherein object properties for text object types comprise an object location on page, and at least one textual phrase, object properties for graphical object types comprise an object location on page and thumbnail image data for each graphical object and object properties for hyperlink object types comprise an object location on page and an object classification for what each hyperlink object links to, for each hyperlink object;
    generating map information regarding the target pages and each set of linked related pages, the map information comprising the page properties and the object properties of the target pages, configured such that, when the map information is displayed at a remote client as a map of a target page, the map of the target page contains all of the map information arranged according to the properties of the objects in a user-navigable display that enables user exploration of the objects including selecting any hyperlink found in the hyperlink objects that links to a page to request an additional web map of the page the selected hyperlink links to.

2. A method according to claim 1, further comprising creating a map page comprising a graphical representation of selected map information for at least one of the set of linked related pages.

3. A method according to claim 2, wherein the creating step further comprises representing the selected map information as a hierarchy of linked pages.

4. A method according to claim 2, further comprising serving the map page in response to selection of one of the hyperlinks referencing the target pages.

5. A method according to claim 1, further comprising storing the map information in a database for later use in the compiling step.

6. A method according to claim 5, further comprising recalling the map information from the database in response to a request for the map information, wherein the request is generated by user selection of an associated one of the hyperlinks on a map of a target page.

7. A method according to claim 6, further comprising receiving the request by detecting a mouse-over of the associated one of the hyperlinks.

8. A method according to claim 5, further comprising deleting the map information from the database after a predetermined period of inactivity.

9. A method according to claim 1, further comprising automatically selecting the plurality of target pages for generating map information using predetermined criteria applied to query results returned by an Internet search engine.

10. A computer-implemented system for mapping information on a wide area network, the system comprising a host connected to said network and operably associated with a memory holding executable instructions for:
    mapping a plurality of target pages, each of the target pages having a network address and comprising at least one hyperlink to a related page;
    identifying a set of linked related pages for each of the plurality of target pages;
    parsing the set of target pages to generate page properties comprising a page address, page title, page file size, and metatags, for each page in the set of target pages;
    parsing the set of target pages to identify objects that exist on the target pages including text objects, graphical objects and hyperlink objects;
    defining an identifier for each object and defining object properties for the objects that exist on the target pages, wherein object properties for text object types comprise an object location on page, and at least one textual phrase, object properties for graphical object types comprise an object location on page and thumbnail image data for each graphical object and object properties for hyperlink object types comprise an object location on page and an object classification for what each hyperlink object links to, for each hyperlink object;
    generating map information regarding the target pages and each set of linked related pages, the map information comprising the page properties and the object properties of the target pages, configured such that, when the map information is displayed at a remote client as a map of a target page, the map of the target page contains all of the map information arranged according to the properties of the objects in a user-navigable display that enables user exploration of the objects including selecting any hyperlink found in the hyperlink objects that links to a page to request an additional web map of the page the selected hyperlink links to.

11. A system according to claim 10, wherein the instructions further comprise creating a map page comprising a graphical representation of selected map information for at least one of the set of linked related pages.

12. A system according to claim 11, wherein the creating step of the instructions further comprises representing the selected map information as a hierarchy of linked pages.

13. A system according to claim 11, wherein the instructions further comprise serving the map page in response to selection of an associated identifier.

14. A system according to claim 10, wherein the instructions further comprise storing the map information in a database for later use in the compiling step.

15. A system according to claim 14, wherein the instructions further comprise recalling the map information from the database in response to a request for the map information, wherein the request is generated by user selection of an associated one of the hyperlinks on a map of a target page.

16. A system according to claim 15, wherein the instructions further comprise receiving the request by detecting a mouse-over of the associated one of the hyperlinks.

17. A system according to claim 10, wherein the instructions further comprise cooperating with an application module operating on a client computer, the application module configured for generating a map page from the map information provided by the host.

18. A system according to claim 17, wherein the application module is a distributable application for delivery to the client computer.

19. A system according to claim 10, wherein the instructions further comprise automatically selecting the plurality of target pages for generating map information using predetermined criteria applied to query results returned by an Internet search engine.

* * * * *